United States Patent
Porte et al.

(10) Patent No.: US 6,755,280 B2
(45) Date of Patent: Jun. 29, 2004

(54) METHOD FOR PRODUCING A PANEL COMPRISING AN ADAPTED ACOUSTICALLY RESISTIVE LAYER AND PANEL SO OBTAINED

(75) Inventors: Alain Porte, Colomiers (FR); Hervé Batard, Tournefeuille (FR)

(73) Assignee: Airbus France, Toulouse (FR)

( * ) Notice: Subject to any disclaimer, the term of this patent is extended or adjusted under 35 U.S.C. 154(b) by 1 day.

(21) Appl. No.: 10/093,496

(22) Filed: Mar. 11, 2002

(65) Prior Publication Data

US 2002/0125067 A1 Sep. 12, 2002

(30) Foreign Application Priority Data

Mar. 9, 2001 (FR) .............................................. 01 03227

(51) Int. Cl.[7] .............................. E04B 1/82; E04B 1/84
(52) U.S. Cl. ........................ 181/290; 181/292; 181/294
(58) Field of Search ................................ 181/291, 284, 181/290, 292, 294, 210, 214, 222, 286, 288; 242/439, 440, 445, 478.2, 578; 428/116; 156/169, 308.2, 309.6

(56) References Cited

U.S. PATENT DOCUMENTS

| | | | |
|---|---|---|---|
| 3,300,354 A | * | 1/1967 | Duft .......................... 156/169 |
| 4,327,816 A | | 5/1982 | Bennett |
| 4,495,764 A | * | 1/1985 | Gnagy .......................... 60/255 |
| 4,600,619 A | * | 7/1986 | Chee et al. .................. 428/118 |
| 5,151,144 A | * | 9/1992 | Chlupsa ....................... 156/171 |
| 5,594,216 A | | 1/1997 | Yasukawa et al. |
| 6,268,038 B1 | * | 7/2001 | Porte et al. .................. 428/116 |
| 6,431,490 B1 | * | 8/2002 | Monget et al. ............. 242/444 |
| 6,439,340 B1 | * | 8/2002 | Shirvan ....................... 181/213 |
| 6,536,556 B2 | * | 3/2003 | Porte et al. .................. 181/292 |
| 6,607,625 B2 | * | 8/2003 | Andre et al. ................. 156/169 |
| 2001/0005937 A1 | * | 7/2001 | Andre et al. ............... 29/888.01 |
| 2002/0070077 A1 | * | 6/2002 | Porte et al. .................. 181/292 |
| 2002/0078569 A1 | * | 6/2002 | Buge et al. ............... 29/897.32 |
| 2002/0157764 A1 | * | 10/2002 | Andre et al. ................. 156/156 |
| 2003/0021976 A1 | * | 1/2003 | Dublineau et al. ........ 428/297.4 |

FOREIGN PATENT DOCUMENTS

| | | |
|---|---|---|
| FR | 2767411 | 2/1999 |
| GB | 1 436 724 | 5/1976 |
| GB | 1490923 | 11/1977 |

* cited by examiner

Primary Examiner—Rina Duda
Assistant Examiner—Patrick Miller
(74) Attorney, Agent, or Firm—Young & Thompson

(57) ABSTRACT

A process for the production of a panel (9) with a fitted acoustically resistive layer, including at least one central core with porous structure bounded on one side by a structural layer covered with a porous acoustically resistive layer and, on the other side, by a total acoustical reflector, in which, successively, acoustically resistive strips are laid down to form the layer on a mold (M) shaped like the panel to be obtained, the structural layer is emplaced, the core of porous structure is emplaced, the total reflector is emplaced, then the mold (M) is withdrawn from the panel. When laying down on the mold (M) the acoustically resistive layer, the porosity of this latter is locally adapted to correspond with the characteristics of the sonic wave at the point of impact, the correlation between characteristics and impact region being previously determined by conventional acoustical techniques applied to a test panel identical to that to be produced.

20 Claims, 3 Drawing Sheets

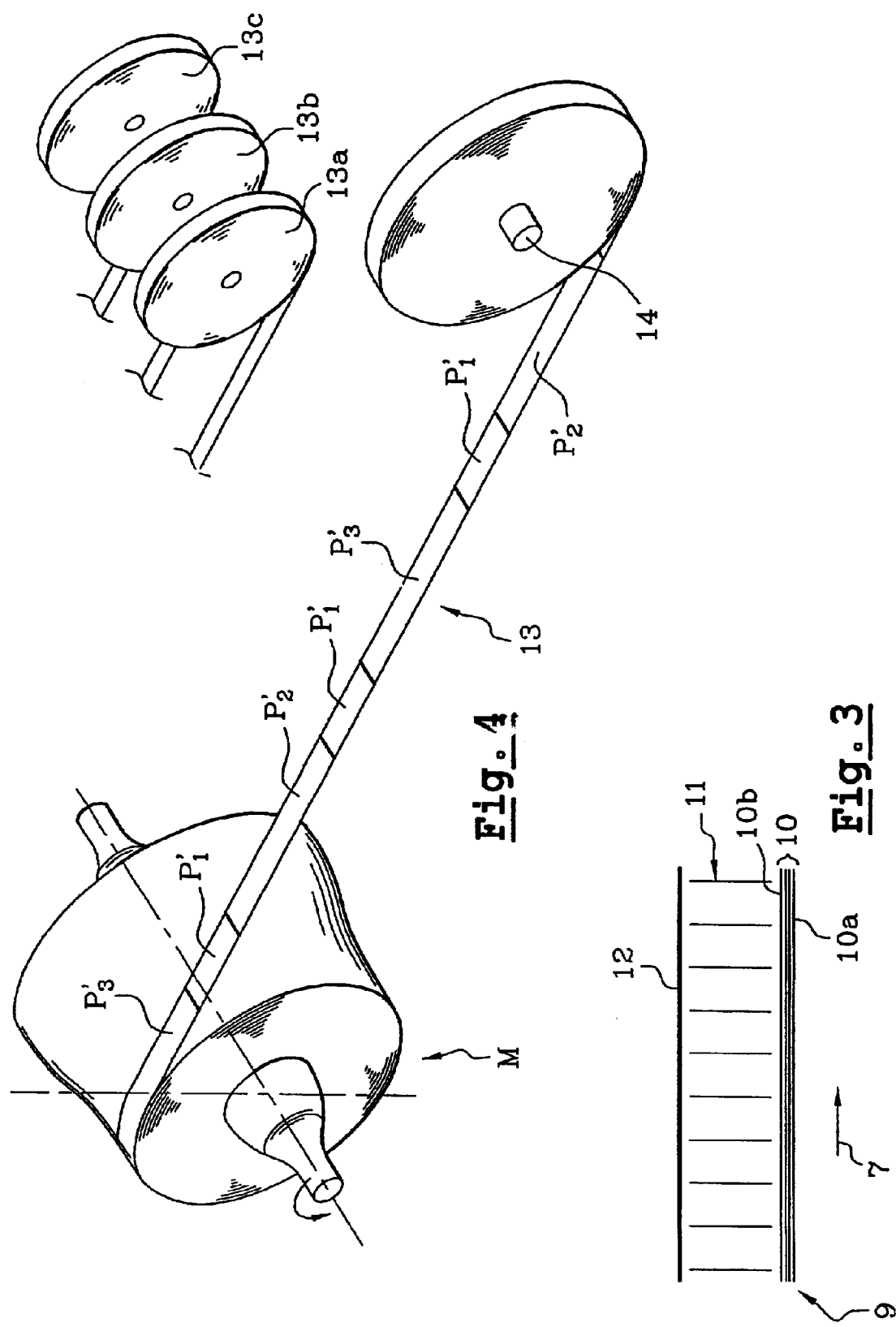

METHOD FOR PRODUCING A PANEL COMPRISING AN ADAPTED ACOUSTICALLY RESISTIVE LAYER AND PANEL SO OBTAINED

BACKGROUND OF THE INVENTION

The present invention relates to acoustic attenuation panels and more particularly those lining the annular fan channels formed in the nacelles of aircraft turbo engines in particular.

DESCRIPTION OF THE RELATED ART

Such panels form the envelope, on the side of the fan channel, of the nacelle, behind the air inlet cowling and have a structure suitable to attenuate the noise produced by the motor surrounded by the nacelle and particularly the noise produced by the fan.

In practice, these panels integrate an open work core, such as a honeycomb sandwich structure, on the side of the fan channel, an acoustically resistive layer and, on the opposite side, a rear reflector.

The acoustically resistive layer plays a dissipating role, by partially transforming the acoustic energy of the sound wave passing through it, into heat.

This porous structure can be, for example, a woven cloth or a cloth of carbon fibers whose weave permits fulfilling its dissipating function.

As these acoustic panels must also have sufficient structural properties particularly to receive and transfer the aerodynamic and inertial forces and those connected with the securement of the nacelle, to the nacelle/motor structural connections, it is necessary to impart to the acoustically resistive layer structural properties.

To this end, one can, as shown by the patent GB 2 130 963, provide an acoustically resistive layer of two components, namely a structural layer, on the honeycomb side and a porous surface layer, or else use as a resistive layer a cloth combining both acoustic function and the structural function by selecting a diameter of the filaments of the cloth giving to this latter a high resistance to force coupled with good acoustical resistance.

For the production of such panels, the process is known consisting in providing the annular assembly forming the wall of the fan channel, in two half panels and two splints comprising, for each half panel, the following steps:

predeformation of a layer of porous structure on a form identical to a half panel with the help of jaws stretching the porous material to its elastic limit, acoustic measurement of the shape thus produced so as to qualify the mean value of acoustic porosity, fitting to the mean value above, of the winding interval of the carbon filaments that are to be deposited on the porous layer to constitute a structural layer, emplacement on a suitable mold of the predeformed shape, then producing the half panel by known winding techniques of said carbon filaments, and emplacing the porous core and the rear reflector.

This process has drawbacks.

Thus, the shape to be produced not being one of revolution, there exists in the deformed layer inhomogeneous zones, which is to say stretched zones and compressed zones, which degrade the overall acoustic quality of the porous structure. The winding interval of the carbon filaments being suitable for the means value of acoustic porosity of the structure, the inhomogeneous zones introduce variations in the acoustic attenuation of the noise generated by the motor.

Moreover, the presence of splints connecting the two half panels introduces discontinuities of impedance in the final acoustic panel, which is prejudicial to the quality of attenuation of the noises generated by the motor.

To overcome these drawbacks, one can, as taught by French patent 2 767 411 in the name of the applicant, emplace the acoustically resistive layer by wrapping with a porous material in the form of a strip.

This manner of operation not only permits avoiding inhomogeneous zones as to the acoustics of the porous layer in question, as indicated above, in the usual technique of producing two half panels, but also eliminates the need for splinting, the winding of the porous layer being able to take the place of the other layers, namely the structural layer, the central porous core, the rear reflector, so as to produce a complete acoustic panel in a single piece without splints.

The absence of splints permits increasing the effective acoustic surface of the panel, decreasing its mass and reducing the time and cost of fabrication.

If such a panel produces high quality acoustic damping, this damping is however not optimum. Thus, the physical characteristics of the resistive layer are homogeneous over all the extent of the panel and determined in consideration of the mean value of the noise which it is desired to damp.

However, the different modes of propagation of sound waves change in the course of their propagation in the fan channel. Thus, certain modes undergo high attenuation whilst others, on the contrary, are practically unaffected by the acoustic panel. Furthermore, the characteristics of the noise to be attenuated are different from one point to another in the channel. As a result, an acoustic attenuation panel of the type described above, attenuating only a limited number of modes, does not permit optimum damping of the noise.

Furthermore, the acoustic panels having for their object to attenuate the noise generated by the motor, it is preferred to attenuate the portion of the noise which radiates toward the ground. This requirement gives rise to a dissymmetric treatment of the problem of attenuation because the downward attenuation is favored relative to the upward.

The known panels are in no way adapted for such a differential acoustic treatment.

SUMMARY OF THE INVENTION

The present invention has precisely for its object to provide a process for production of acoustic attenuation panels of the above type, permitting adapting the acoustically resistive layer to the sonic environment of the panels so as to obtain a truly optimum damping.

To this end, the invention has for its object a process for the production of a panel with a shaped acoustically resistive layer, of the type comprising at least one central core with a faced porous structure, on the one side, a structural layer itself covered with a porous acoustically resistive layer and, on the other side, a total acoustic reflector, in which, successively:

there is wound stripwise said acoustically resistive layer on a mold shaped to the profile of the panel to be obtained, said structural layer is emplaced, said core with a porous structure is emplaced, said total reflector is emplaced, then the mold is withdrawn from the panel, characterized in that in the course of depositing on the mold the acoustically resistive layer, the porosity of this latter is locally adapted to correspond with the characteristics of the sonic wave at the point of impact, the correlation between characteristic and impact zone being preliminarily determined with the help of conventional acoustic techniques applied to a test panel identical to that to be produced.

According to a first embodiment of practicing the procedure, there is first produced a continuous strip of acoustically resistive material constituted by end to end sections of different porosities and this strip is laid down on the mold, the porosity and length of each section as well as the manner of deposition being determined such that once the acoustically resistive layer is in place, the latter will be divided into at least as many contiguous regions as different porosities in each strip, in correspondence with the different predetermined acoustical regions in the course of said preliminary correlation carried out on the test panel.

According to a second embodiment of practice of the process, there is first provided a plurality of strips of acoustically resistant material of different porosities and these are laid on the mold successively in order, and the order of deposition is predetermined such that once the acoustically resistive layer is in place, the latter will be divided into at least as any contiguous zones as there are different porosities, in correspondence with the different acoustic zones determined in the course of said preliminary correlation carried out on the test panel.

According to a third manner of practicing the process, there is first provided a strip of an acoustically resistive material of the same nature but whose porosity varies longitudinally with the strip and this is laid on said mold, the ways of varying the porosity and of laying the strip being predetermined such that once the acoustically resistive layer is in place, the latter has local variations of porosity in correspondence with the different acoustic regions determined in the course of said preliminary correlation carried out with the test panel.

The invention also has for its object the panels obtained according to the above process, particularly acoustic attenuation panels for a fan channel, of a single piece without splints.

BRIEF DESCRIPTION OF THE DRAWINGS

Other characteristics and advantages will become apparent from the description which follows of embodiments of the process of the invention, which description is given only by way of example, and with respect to the accompanying drawings, in which:

FIG. 3 is a schematic cross-section of an acoustic attenuation panel;

FIG. 4 is a schematic perspective view showing the winding on the mold of a strip of acoustically resistive material constituted by end to end sections of different porosities.

Figure 1:
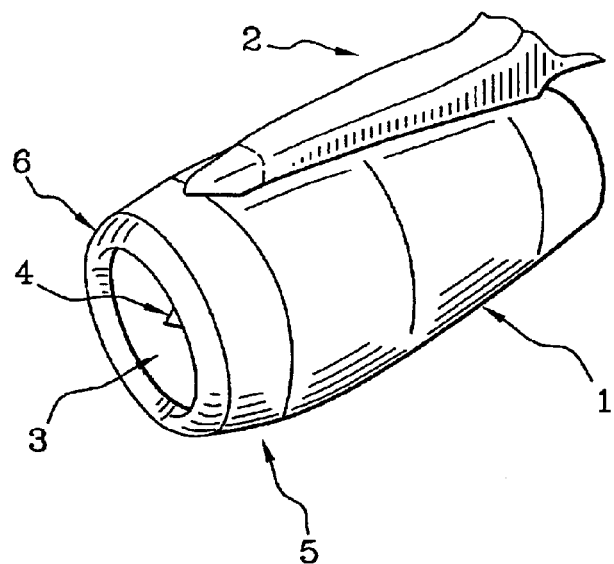
FIG. 1 is a schematic perspective view of an aircraft engine.

There is shown in FIG. 1 an aircraft turbo reactor comprising a nacelle 1 coaxially surrounding the motor properly so called and fixed for example to a wing (not shown) of the aircraft by means of a mast generally indicated by reference numeral 2.

The nacelle 1 has an annular cross-section and defines between it and the central portion of the engine, an annular channel 3 for a fan. There is shown at 4 in the figure the nose of ogive shape of the fan driven by the motor and which is disposed at the inlet of the channel.

The forward portion 5 of the nacelle 1 constitutes an air inlet structure which has particularly the function of ensuring the aerodynamic flow of air, on the one hand, toward the fan channel 3, and on the other hand, toward the outside of the nacelle 1.

Figure 2:
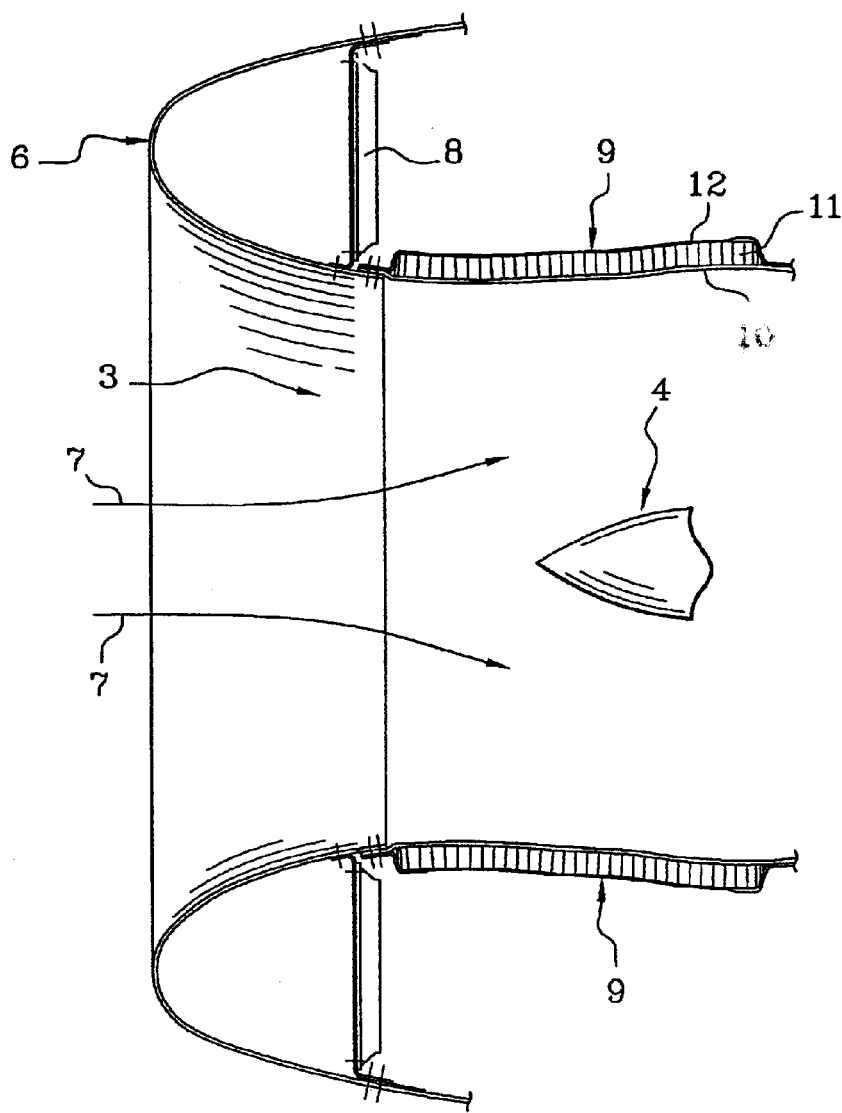
FIG. 2 is a fragmentary axial cross-sectional view of the nose of the engine of FIG. 1.

As can be seen in FIG. 2, which is an axial cross-section of the nose of the nacelle 1, the air inlet structure is comprised conventionally with an air inlet cowling 6 having in cross-section the shape of a rearwardly open V. This cowling forms the external envelope of the front portion of the air inlet structure and ensures division of the air between the portion 7 which enters the fan channel 3 and the portion which flows about the nacelle.

The air inlet structure comprises, in addition to the cowling 6, a front reinforcing frame 8 and an acoustic attenuation panel 9.

This panel 9 has a generally annular shape and defines said fan channel by its internal surface 10 in contact with the aerodynamic flow 7. The panel has a structure adapted to attenuate the noise produced by the central portion of the motor and particularly by the fan.

In practice, this structure is habitually of the sandwich composite type and comprises, in addition to an acoustically resistive porous layer constituting the surface 10, a porous core 11 such as a honeycomb and, opposite the porous layer 10, a layer 12 forming a total acoustical reflector.

The porous structure 11 can be single, which is to say a single resonator or a multi-layer porous core, or else multiple, which is to say with superposed resonators or a porous core formed of several superposed layers separated or not by partitions.

The process of the invention is applicable particularly to the production of acoustic attenuation panels such as the panel 9.

More precisely still, the invention seeks to provide in a panel of the type of panel 9 and comprising, as shown in FIG. 3, a resistive layer (10) formed of two components, namely a porous layer 10a in contact with the aerodynamic flow 7 and a structural layer 10b interposed between this layer and the central porous core 11.

Preferably, such a panel will be made according to the process described in FR 2 767 411 permitting obtaining an annular panel in a single piece, without splints, by deposition of the different constituent layers of the sandwich by laying down, draping or winding.

The present invention envisions, during production of such a panel, essentially to adapt locally the acoustic properties of the acoustically resistive layer 10a to the sonic environment of the panel.

To this end, there is first produced a test panel identical to the panel 9 and conventional, and there are carried out by tests in a wind tunnel for example, by techniques well known to acousticians and which is not necessary to recite here, tests permitting recognizing the different acoustic zones of the panel, which is to say the places on the panel where different sonic damping show up and deriving the porosity which it would be necessary to give to the different regions of the resistive layer of the panel to have optimum damping.

There is thus obtained a geographic map reproducing the internal surface of the panel in the form of juxtaposed regions of different porosities.

This established, according to the invention, this geographic map will be reproduced during the production of the acoustically resistive layer 10a, which is to say during its formation by laying down strips on a mold or suitable mandrel, according to several different modes of procedure.

Figure 5A:
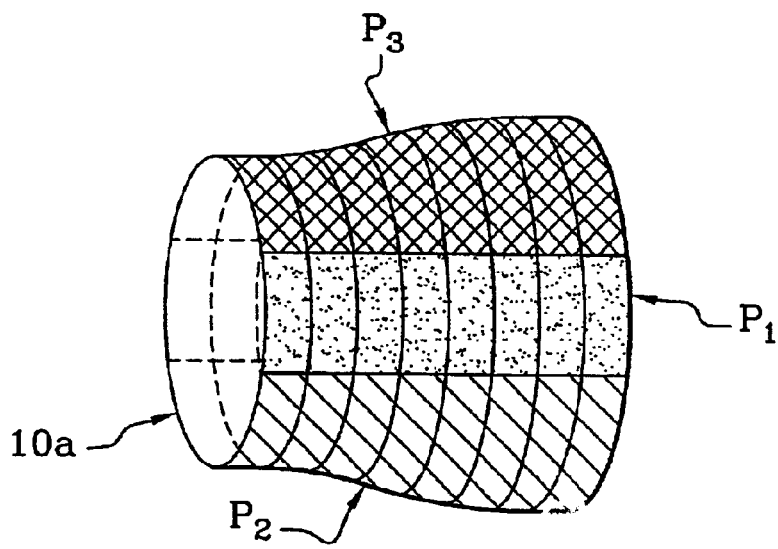
FIGS. 5a to 5c show schematically in perspective three different methods of laying down the strip on the mold of FIG. 4.

There will first be made reference to FIGS. 4 and 5a, which show the practice of the process of the invention according to a first embodiment leading to the production of an annular resistive layer 10a having, as shown in FIG. 5a, three regions of different porosities, respectively a narrow central strip P1 whose axis is substantially parallel to that of the layer 10a, flanked by two regions P2 and P3.

According to this first embodiment of the process, there is produced (FIG. 4) first a continuous strip 13 of acoustically resistive material stored for example in rolled form on a core 14.

The strip 13 is formed of sections placed end to end, of different porosities, and deposited by winding on a mold M whose shapes and dimensions correspond to the panel 9.

The deposition of the strip on the mold takes place helicoidally, the windings being for example touching as shown in FIG. 5a so as to cover the mold with a single layer constituting said acoustically resistive layer 10a.

In FIG. 4, there is shown a section of strip P'1 flanked by sections P'2 and P'3.

The length of the sections P'1, P'2 and P'3 as well as the methods of deposition on the mold M, are of course determined such that at each complete turn of the mold M, said sections P'1 to P'3 will position themselves correctly so that the juxtaposition of the sections P'1 defines the strip P1 of FIG. 5a, in correspondence with the map of the regions of different porosities defined with the help of the test panel.

The material of the strip 13 is for example a cloth formed by a stainless steel mesh of a type available commercially or carbon fibers or glass fiber pre-impregnated with a thermosetting or thermoplastic resin.

The different porosities of sections P'1 to P'3, which are adapted to those of the three homologous regions determined on the test panel, are obtained for example by different spacing of the meshes or of the warp and/or weft filaments of the cloths or metallic meshes, or else, in the case of a strip 13 of carbon or glass fibers, by a modification of the size and/or distribution of the holes produced in the strip to render it porous.

The sections P'1 to P'3 are joined end to end for example by welding or cementing.

After emplacement on the mold M of the acoustically resistive layer 10a, there is emplaced on the mold M, in a known manner, from above, the layer 10a, successively to the structural layer 10b, for example by laying down or winding, of the porous central core 11, by laying down, draping or winding, and finally the total acoustic reflector 12, by laying down, draping or winding.

When all the elements of the panel have been emplaced, the panel is demolded by disassembling, retracting or melting the mold M. The consolidation of the layers of the panel takes place by heating, with or after demolding.

Figure 5B:
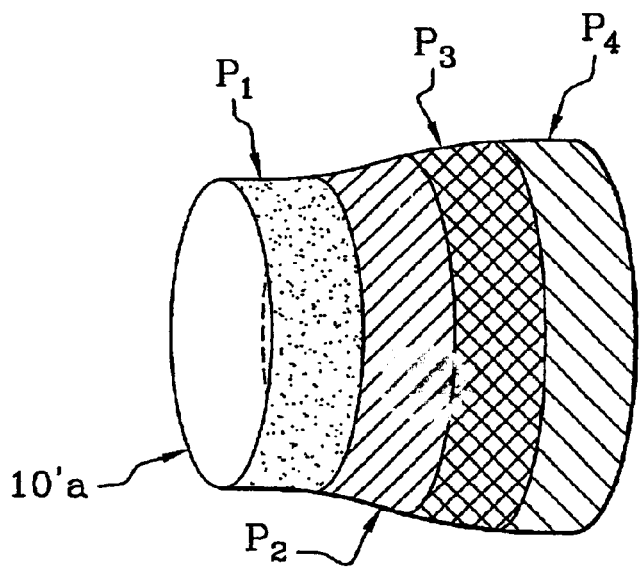

FIG. 5b shows a different distribution of the zones of different porosity to be produced on the acoustically resistive layer 10a to be manufactured.

In this figure, there are shown four different zones P1 to P4 constituted by four juxtaposed windings resulting from the helicoidal winding of a strip of the type of the strip of FIG. 4 and which will be formed of four successive sections of different porosities.

Figure 5C:
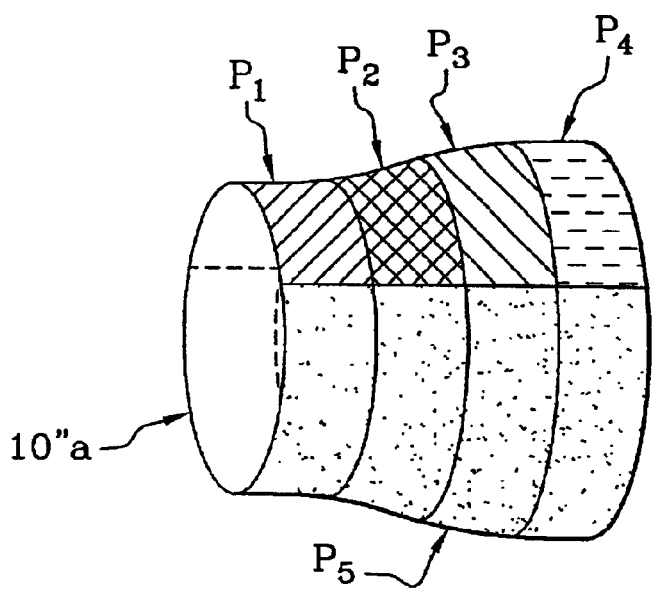

FIG. 5c shows a more complicated distribution of five zones P1 to P5 of different porosities of the layer 10"a.

Generally speaking, the length of each section (P1 to P5) will be determined very precisely as a function of the shape and of the dimensions of the mold M, such that the lines of demarcation of the different zones of different porosity will correspond nicely to the map established with the help of said test panel.

In FIG. 4, there is shown at 13a, 13b and 13c, three wound strips of acoustically resistive material of different porosities, each strip being formed by a single material with constant porosity.

These three strips 13a, 13b, 13c can be used to replace the strip 13 to make a layer 10a whose three different porosities will be considered with the help of the three above strips.

At the portion of the mold M where a section of strip of porosity B1 is to be deposited, it suffices to deposit by laying down a section of one of the strips 13a to 13c which will be cut off at a suitable length and secured, for example by cementing, with the preceding section, then with the following section, from another strip.

According to a third embodiment of procedure, the strip 13 is made of a single continuous piece of an acoustically resistive material whose porosity will be locally modified in correspondence with that of the desired sections P'1, P'2, P'3. This material can be a cloth or metallic grill of which the porosity can be varied by more or less small openings.

The material can also be a cloth of carbon fibers or of pre-impregnated glass fibers, whose porosity will vary mesh-wise by modifying the parameters (diameter and/or distribution) of the holes which will be pierced in the strip.

Thus, for the portion of the strip corresponding to the section P'1 for example of FIG. 4, the spacing between the weft and/or warp threads of the cloth will have a predetermined value, for the portion of the length corresponding to the section P'2, the space will be different and so on for the other portions of the strip.

It is to be noted that in the embodiment of the strip as that of strip 13 of FIG. 4, the transition between two portions of different porosity need not be abrupt but can be progressive by providing a buffer zone with progressively varying porosity.

The acoustic panels obtained according to the invention thus ensure a truly optimum acoustic damping, because they are adapted to each region of a panel with wave characteristics which will strike the panel.

Thus particularly such panels can be used in the nacelles of turbo engines to attain an acoustic attenuation directed toward the ground, permitting particularly better to satisfy the regulations as to noise imposed by airports.

As acoustically resistive material usable according to the invention, there can be selected any material that can be placed in the form of a strip or ribbon and according to the standards set forth above, either at the time of producing said strip or later.

What is claimed is:

1. Process for the production of a panel with a fitted acoustically resistive layer comprising at least one central core of porous structure bounded on a first side with a structural layer, the structural layer covered with a porous acoustically resistive layer and, bounded on a second side with a total acoustical reflector, comprising the successive steps of:

laying down said acoustically resistive layer in strips on a mold according to a profile of the panel to be obtained;

placing said structural layer on said resistive layer;

placing said core with a porous structure on said structural layer;

placing said total reflector on said core; and withdrawing the mold from the thus-formed panel, wherein, there is first produced a continuous strip of acoustically resistive material constituted by end to end sections of different porosities and said strip is laid down on the mold to form said acoustically resistive layer, and the porosity and length of each section as well as a method of laying down each section is predetermined such that once the acoustically resistive layer is laid down, the acoustically resistive layer will be divided into at least as many contiguous regions as the different porosities in said strip, in correspondence with different acoustical zones detected during a preliminary correlation carried out with help of conventional acoustic techniques on a test panel identical to that to be produced.

2. Process according to claim 1, wherein the acoustically resistive material is selected from the group comprising cloth or metallic meshes and cloth of carbon fibers or glass fibers pre-impregnated with a thermoplastic or thermosetting resin.

3. Process according to claim 1, wherein before withdrawing to mold, the panel is subjected to consolidation by heating the thus-formed panel.

4. Process according to claim 1, wherein the acoustically resistive material is selected from the group of cloths or metallic meshes and the various porosities are obtained by modifying, during weaving, the spacing between the weft or warp filaments.

5. Process according to claim 1, wherein the acoustically resistive material is selected from the group of carbon fiber cloth or pre-impregnated glass fiber cloth, and the various porosities are obtained by varying a diameter and/or the distribution of holes pierced in said material.

6. Panel with an acoustically damping layer, obtained according to the process of claim 1.

7. Process for the production of a panel with a fitted acoustically resistive layer comprising at least one central core of porous structure bounded on a first side with a structural layer which structural layer is covered with a porous acoustically resistive layer and, bounded on a second side with a total acoustical reflector, comprising the successive steps of:

laying down said acoustically resistive layer in strips on a mold according to a profile of the panel to be obtained;

placing said structural layer on said resistive layer;

placing said core with a porous structure on said structural layer;

placing said total reflector on said core; and withdrawing the mold from the thus-formed panel, wherein, there is first produced a plurality of strips of acoustically resistive material of different porosities, and there is laid down on the mold successively said strips in an order and with deposition techniques predetermined such that once the acoustically resistive layer is laid down, the acoustically resistive layer will be divided into at least as many contiguous regions as there are different porosities, in correspondence with different acoustic regions detected during a preliminary correlation carried out with help of conventional acoustic techniques on a test panel identical to that to be produced.

8. Process according to claim 7, wherein the acoustically resistive material is selected from the group comprising cloth or metallic meshes and cloth of carbon fibers or glass fibers pre-impregnated with a thermoplastic or thermosetting resin.

9. Process according to claim 7, wherein before withdrawing to mold, the panel is subjected to consolidation by heating the thus-formed panel.

10. Process according to claim 7, wherein the acoustically resistive material is selected from the group of cloths or metallic meshes and the various porosities are obtained by modifying, during weaving, the spacing between the weft or warp filaments.

11. Process according to claim 7, wherein the acoustically resistive material is selected from the group of carbon fiber cloth or pre-impregnated glass fiber cloth, and the various porosities are obtained by varying a diameter and/or the distribution of holes pierced in said material.

12. Panel with an acoustically damping layer, obtained according to the process of claim 7.

13. Process for the production of a panel with a fitted acoustically resistive layer comprising at least one central core of porous structure bounded on a first side with a structural layer which structural layer is covered with a porous acoustically resistive layer and, bounded on a second side with a total acoustical reflector, comprising the successive steps of:

laying down said acoustically resistive layer in strips on a mold according to a profile of the panel to be obtained;

placing said structural layer on said resistive layer;

placing said core with a porous structure on said structural layer;

placing said total reflector on said core; and withdrawing the mold from the thus-formed panel, wherein, there is first produced a strip of an acoustically resistive material of a same nature but with porosity varying longitudinally of the strip and said strip is laid down on the mold, and the method of varying the porosity and of laying down the strip being predetermined such that once the acoustically resistive layer is laid down, the acoustically resistive layer has local variations of porosity corresponding to different acoustic regions detected during a preliminary correlation carried out with help of conventional acoustic techniques on a test panel identical to that to be produced.

14. Process according to claim 13, wherein the porosity of strip varies according to different levels.

15. Process according to claim 14, wherein at each of the levels the transition of the porosity is progressive.

16. Process according to claim 13, wherein the acoustically resistive material is selected from the group comprising cloth or metallic meshes and cloth of carbon fibers or glass fibers pre-impregnated with a thermoplastic or thermosetting resin.

17. Process according to claim 13, wherein before withdrawing to mold, the panel is subjected to consolidation by heating the thus-formed panel.

18. Process according to claim 13, wherein the acoustically resistive material is selected from the group of cloths or metallic meshes and the various porosities are obtained by modifying, during weaving, the spacing between the weft or warp filaments.

19. Process according to claim 13, wherein the acoustically resistive material is selected from the group of carbon fiber cloth or pre-impregnated glass fiber cloth, and the various porosities are obtained by varying a diameter and/or the distribution of holes pierced in said material.

20. Panel with an acoustically damping layer, obtained according to the process of claim 13.

* * * * *